May 6, 1924.　　　　　　　　　　　　　　　　1,492,928
G. C. MOORE
LOOM
Filed Feb. 21, 1923　　　7 Sheets-Sheet 1

May 6, 1924.

G. C. MOORE

LOOM

Filed Feb. 21, 1923     7 Sheets-Sheet 2

1,492,928

May 6, 1924. 1,492,928

G. C. MOORE

LOOM

Filed Feb. 21, 1923 7 Sheets-Sheet 5

Inventor.
George C. Moore,
By
Attorneys.

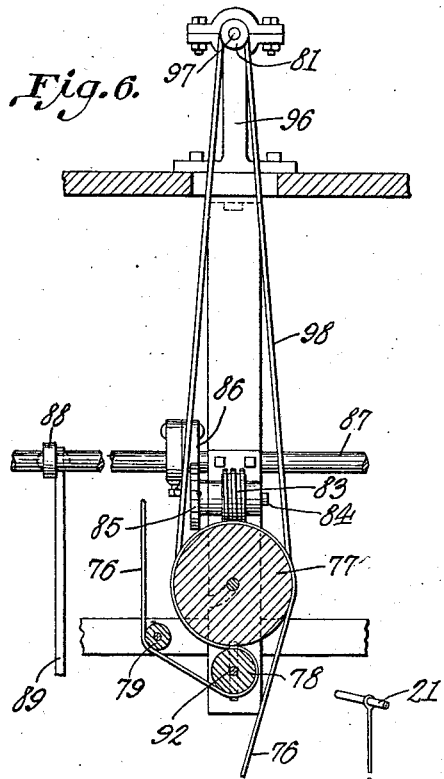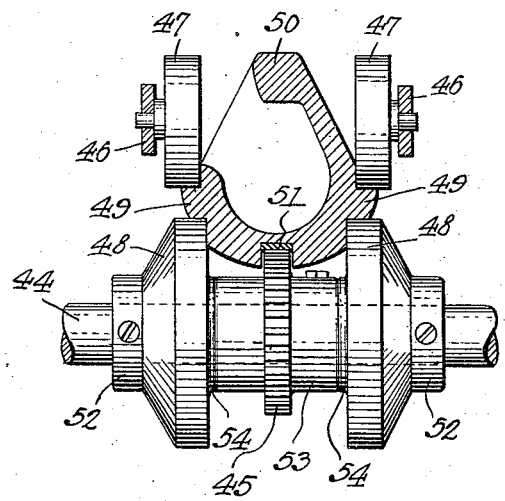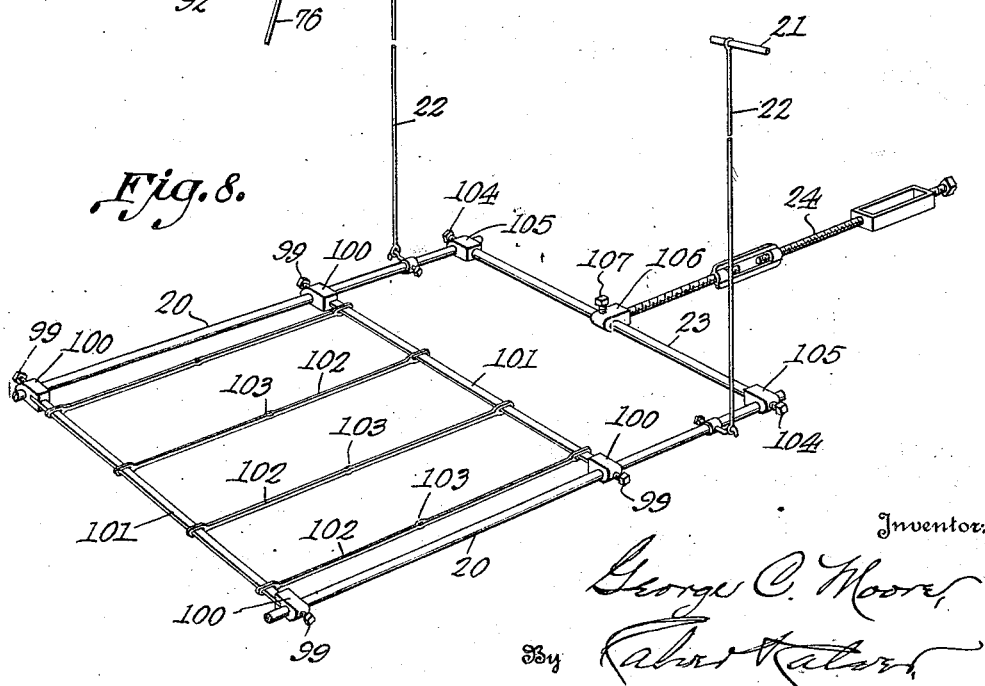

May 6, 1924.
G. C. MOORE
LOOM
Filed Feb. 21, 1923    7 Sheets-Sheet 7
1,492,928
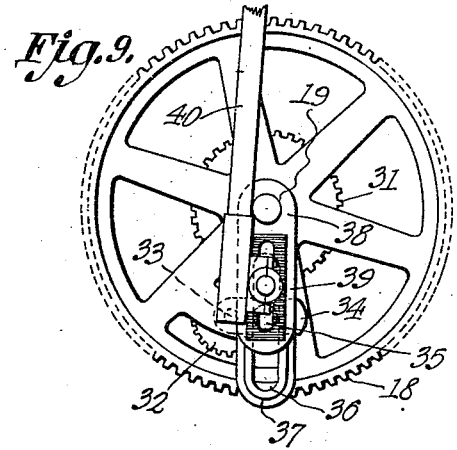
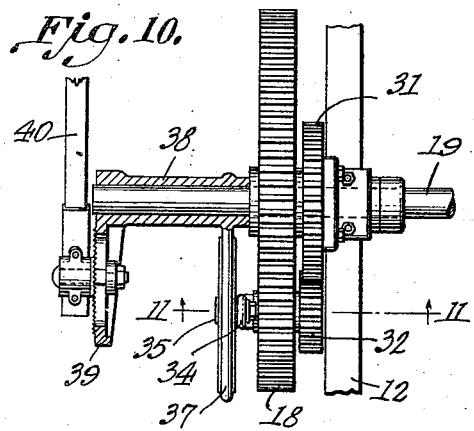
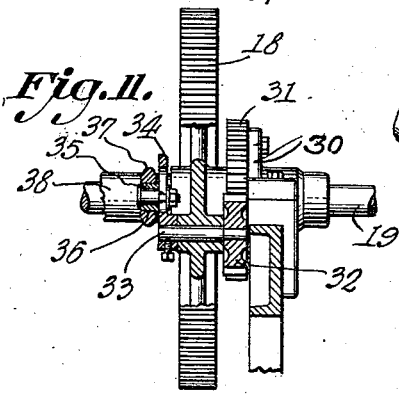
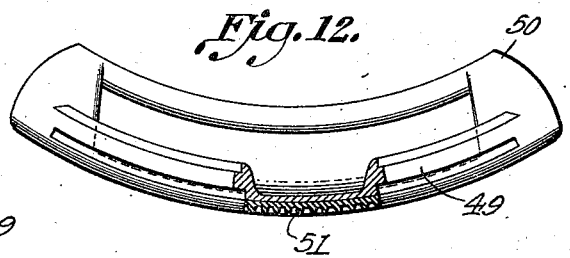
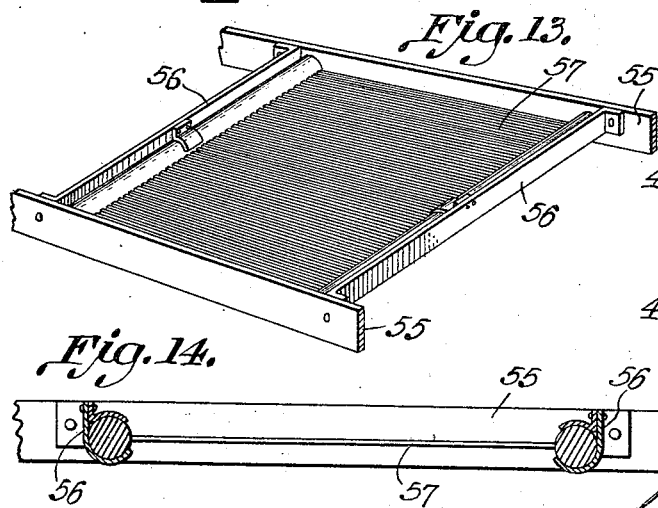
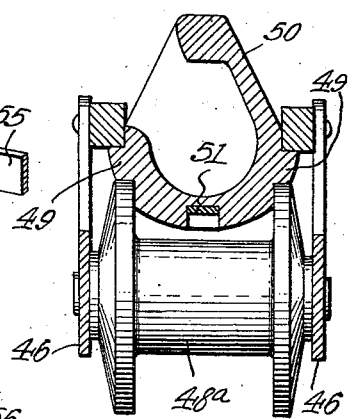
Inventor
George C. Moore
By
Attorneys Patented May 6, 1924.

1,492,928

UNITED STATES PATENT OFFICE.

GEORGE C. MOORE, OF WESTERLY, RHODE ISLAND.

LOOM.

Application filed February 21, 1923. Serial No. 620,418.

*To all whom it may concern:*

Be it known that I, GEORGE C. MOORE, a citizen of the United States, residing at Westerly, in the county of Washington and State of Rhode Island, have invented or discovered certain new and useful Improvements in Looms, of which the following is a specification, reference being had therein to the accompanying drawings.

This invention relates to narrow ware looms of the vertical type and comprises various novel features whereby the productive capacity of looms of this character may be increased while the looms may be run at a minimum expenditure of power, all as will be hereinafter more fully set forth.

In the present improved loom the warps run vertically from the warp beams to the heddles so that friction on the warps and a tendency to the breaking of the warps is reduced to a minimum. Also in the present improved loom the heddles are suspended from above, so as to swing horizontally like pendulums, this construction permitting them to be operated with a minimum expenditure of power. Also in the present improved loom floor space is conserved in such a manner that a greater number of looms than heretofore may be set up in a room of a given size, thus making the compactly arranged looms convenient to look after and rendering it possible for more fabric to be woven by looms attended by the same man or woman. Also in the present improved loom it is possible to use larger warp beams than heretofore, and to carry much larger quantities of yarn in the shuttles, so that in the operation of the loom less stoppages will be necessary than heretofore. It therefore results that the improved loom may be run at much higher speeds with less power than looms of this class heretofore in use.

Figure 1:
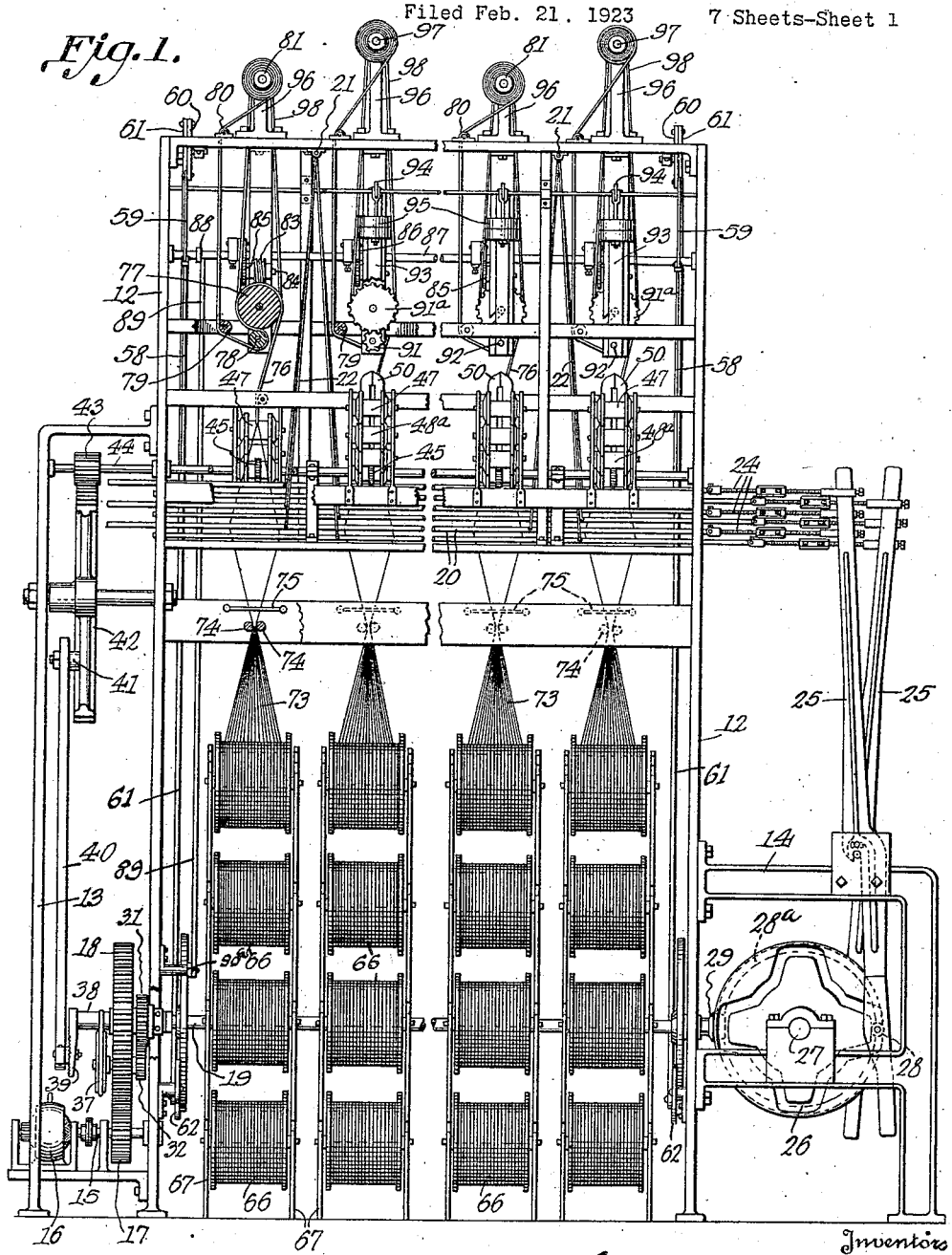
Figure 2:
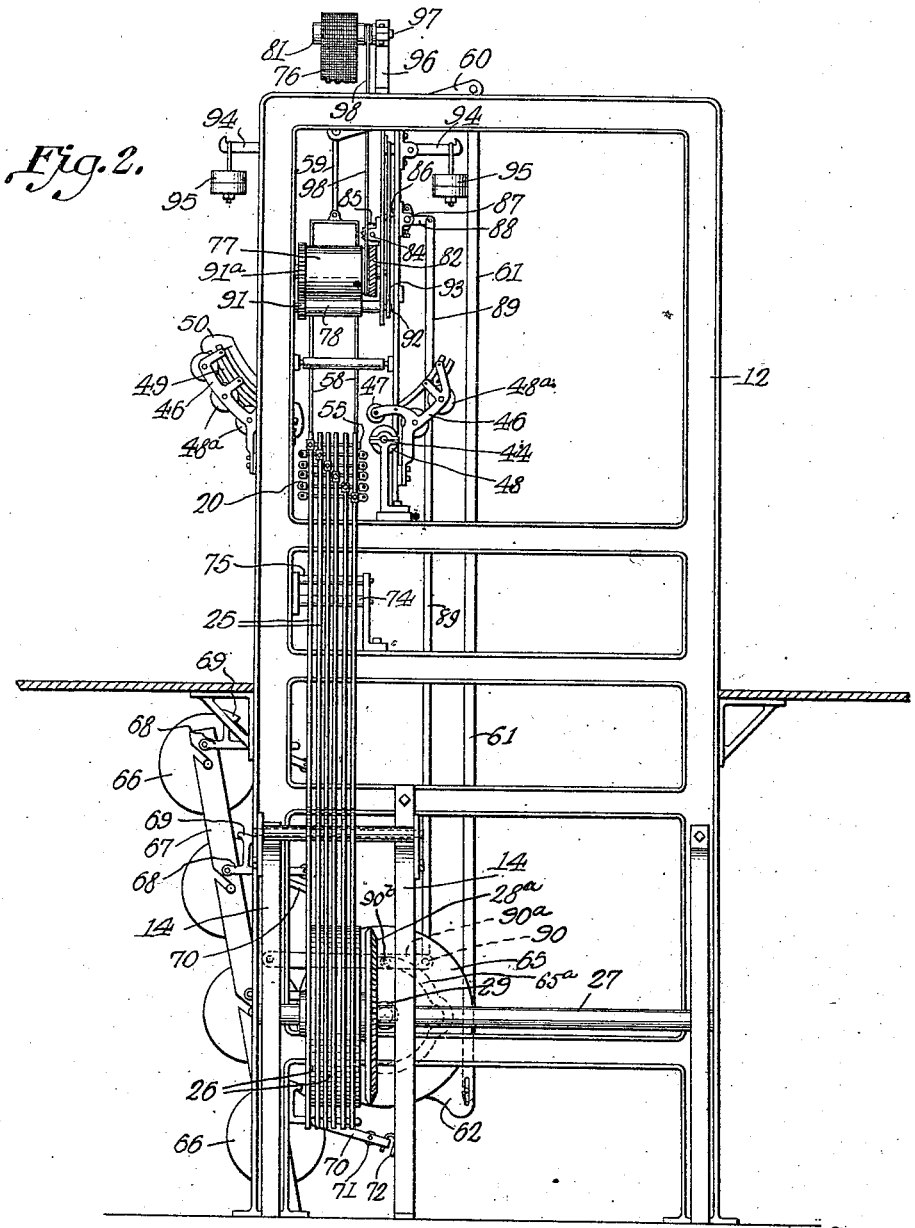
Figure 3:
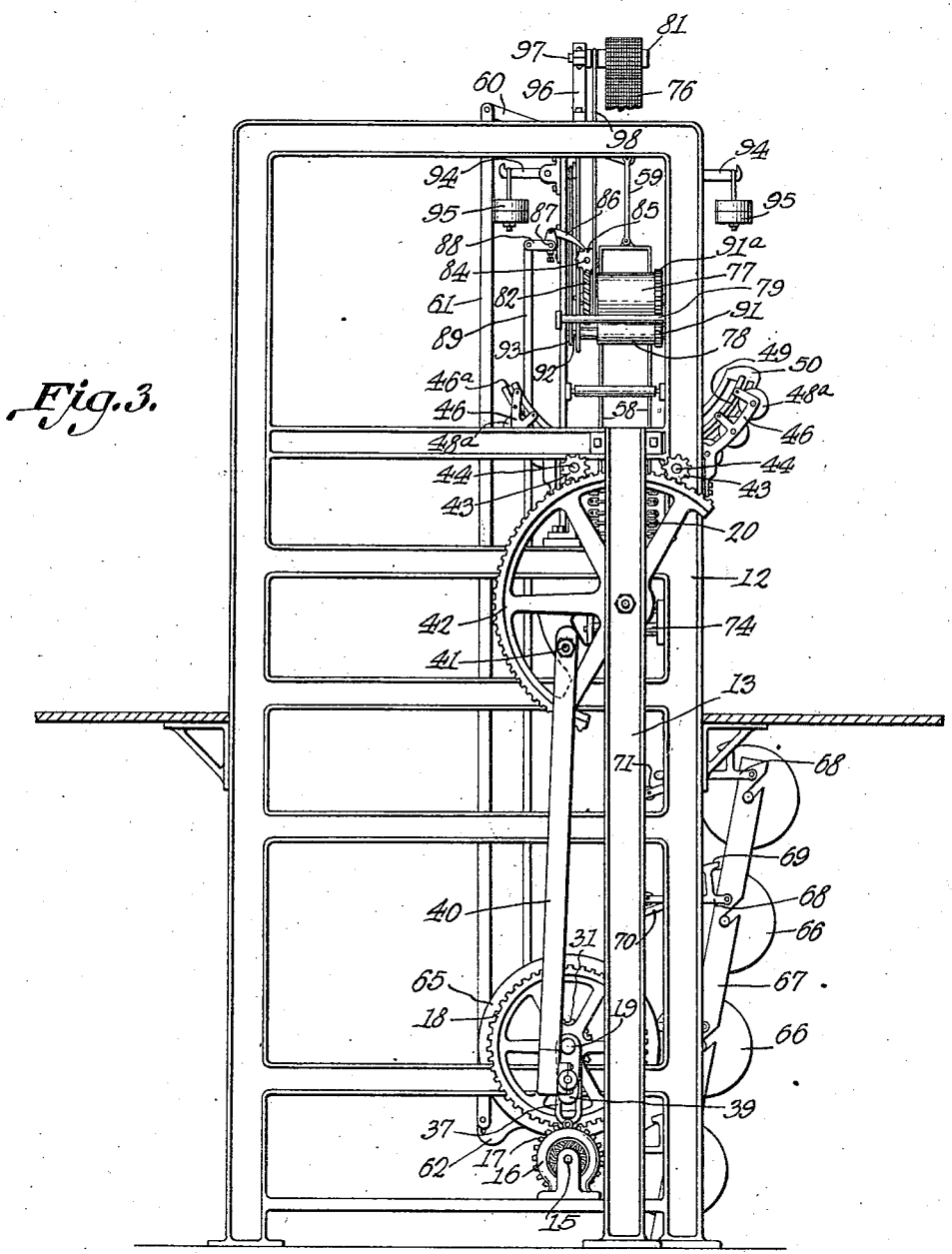
Figure 4:
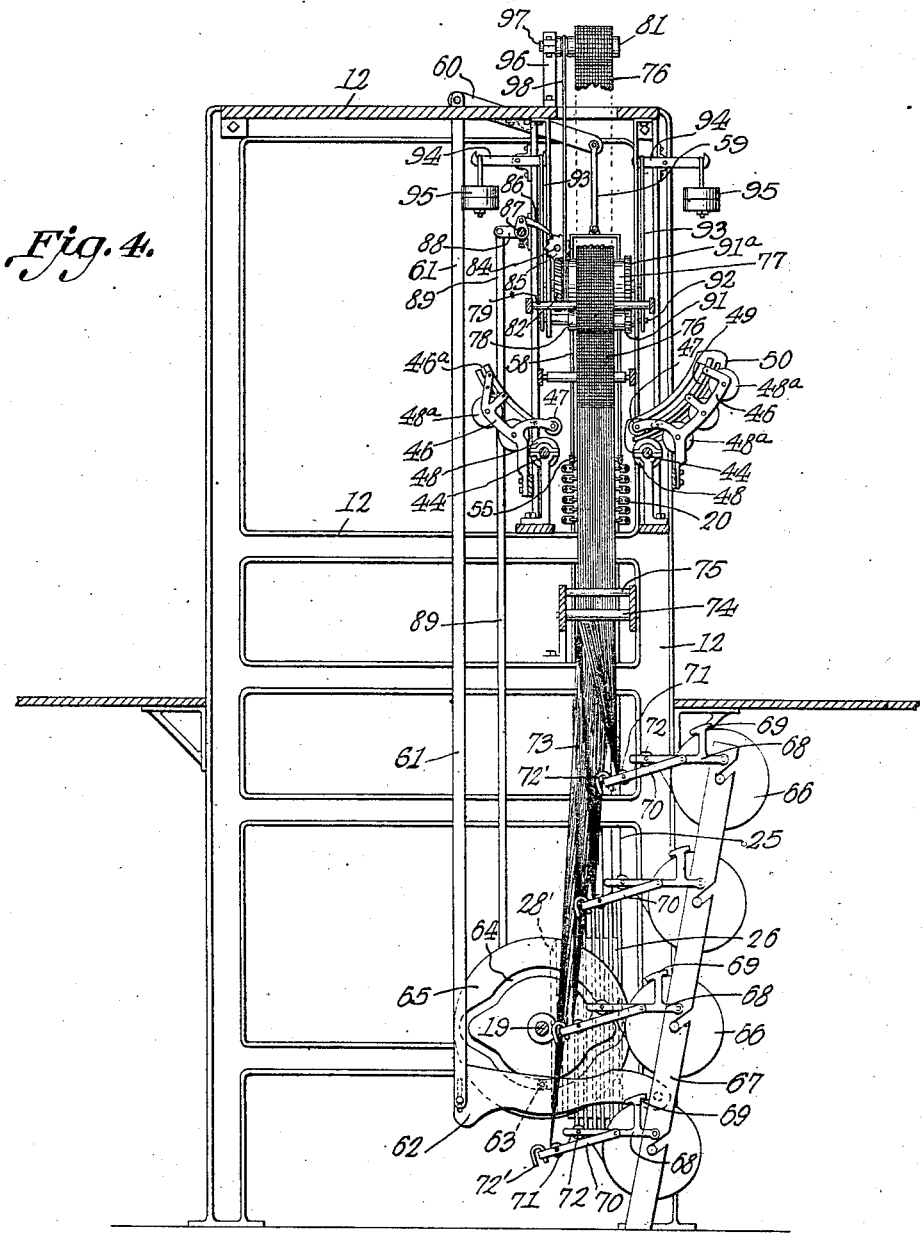
Figure 5:
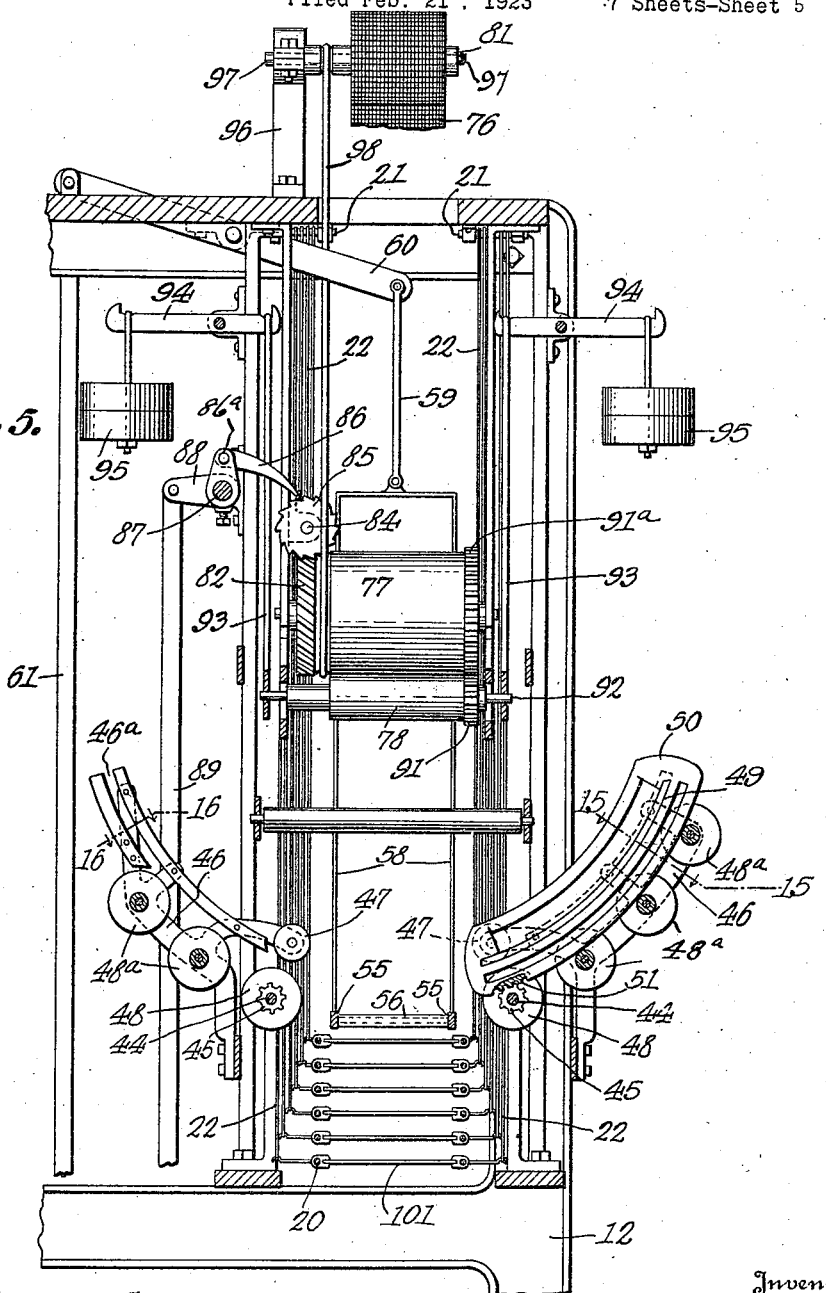
Figure 16:
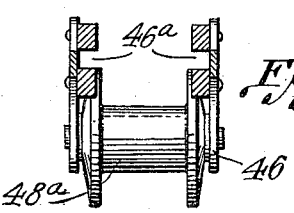

In the accompanying drawings Fig. 1 is a broken out front view of a loom embodying the present invention. Fig. 2 is an end view of the same looking from the right of Fig. 1. Fig. 3 is an end view looking from the left of Fig. 1. Fig. 4 is a vertical section of the improved loom. Fig. 5 is a view similar to Fig. 4 showing the upper part of the same on a somewhat larger scale. Fig. 6 is a detail view of the fabric take-up device. Fig. 7 is a detail view showing the shuttle supporting and driving means. Fig. 8 is a detail perspective view showing a heddle and part of a harness supporting and operating means. Figs. 9, 10 and 11 are detail views of parts of the shuttle operating mechanism. Fig. 12 is a detail view of one of the shuttles. Figs. 13 and 14 are detail views illustrating the construction of the reed frame and reed. Fig. 15 is a section of the shuttle and shuttle frame or raceway on line 15—15, Fig. 5, and Fig. 16 is a detail section of the shuttle frame or raceway on line 16—16, Fig. 5.

Referring to the drawings, 12 denotes the main frame of the loom, the same comprising a suitable number of uprights and cross bars. Rigidly attached to the main frame are supplementary frames 13 and 14. Journalled in the supplementary frame 13 is a driving shaft 15 preferably operated from an electric motor 16, said shaft 15 carrying a gear 17 meshing with a gear 18 on the main operating shaft 19 running through the loom from end to end and from which the various mechanisms of the loom are operated.

The harness frames 20, carrying the heddles, are suspended from suitable supports 21 at the upper part of the frame 12 by wires 22 so that the said harness frames are adapted to have pendulous swinging motions. (See Fig. 8.) To each cross rod 23 of a harness frame is attached an operating rod 24 of well known construction, each of said rods being connected to the upper part of a harness operating lever 25 suitably pivoted on supports on the supplementary frame 14 and operated by cams 26 fixed to a shaft 27, said levers carrying at their lower ends suitable cam rolls 28 entering grooves in cams 26. To the shaft 27 is attached a large bevel gear 28$^a$ meshing with a bevel pinion 29 on the main shaft 19. Thus in the operation of the machine the harness frames will be swung to and fro in an approximately horizontal arc with an easy pendulous motion, as will be understood.

Mounted on a bracket 30 fixed to the frame 12 is a stationary gear wheel 31 concentric with the shaft 19 and through which the said shaft passes. Meshing with the stationary gear wheel 31 is a planetary gear 32 carried by a shaft 33 having its bearing in the gear wheel 18, the said shaft 33 being provided with a fixed crank 34 carrying a roller stud 35 working in a slot 36 in an arm 37 rigid with a hub 38 mounted to oscillate on the shaft 19 and carrying a crank arm 39 to which is adjustably connected the lower end of a pitman 40 attached at its upper end to a crank pin 41 fixed to a toothed sector 42. Meshing with the toothed sector 42 are pinions 43 attached to shafts 44 provided with a series of shuttle operating pinions 45, said shafts extending the entire width of the loom.

Suitably mounted on the frame 12 are curved shuttle frames or raceways 46 supporting rollers 47 between which and rollers 48, side flanges or ribs 49 on the shuttles 50, closely fit. The shuttle frames also support additional rollers 48$^a$ on which the said shuttles run. The shuttle frames or raceways 46 are constructed with guiding slots 46$^a$ in which said side flanges or ribs 49 on the shuttles closely fit, said slots being open-ended at one or both of each pair of shuttle frames or raceways, to permit of the ready insertion of the shuttles. The shuttles 50 are provided with curved racks 51 recessed into the backs or bottoms of the shuttles, said curved racks meshing with the pinions 45. The rollers 48 are mounted on the shafts 44 between collars 52 fixed to said shafts, and the hubs 53 of the gears 45, washers 54 being preferably interposed between said rollers and said hubs. (See Fig. 7.)

From the construction just described it will be understood that the shuttles will be positively operated from the pinions 45, and as the weight of said shuttles is mostly supported by rollers 48 and 48$^a$ the friction on the shuttles will be reduced to a minimum and the said shuttles will have easy running movements owing to their contact with the said rollers. Thus the said shuttles, which are constructed with central, longitudinally extending yarn-holding chambers, are adapted to carry large cops of yarn which will not add appreciably to the frictional resistance of the shuttles. In other words, the shuttles are unusually large for narrow ware weaving and lie on their backs, so to speak, and are evenly balanced, the ribs or side flanges 49 on the shuttles being guided in their movements not only by the rollers 47 and 48 but also by the grooves 46$^a$ in the curved shuttle frames or raceways 46 and the rollers 48$^a$. By running the shuttles in races which are curved relative to a horizontal plane, and operating them by underneath pinions, the latter tend to counteract the effect of gravity by slight lifting action on the shuttles. Moreover by running the shuttles in the races thus curved both the starting and the stopping movements of the shuttles will be assisted by gravity as the shuttles move downward in starting and upward in stopping. For these reasons the large shuttles, carrying large cops of yarn, run very easily.

Extending horizontally throughout the width of the loom is a reed frame comprising longitudinal bars 55 and cross bars 56 between which are mounted the reeds 57 which beat up the wefts, these reeds taking the place of the usual lays or battens. The reed frame is mounted at the lower ends of vertical frames 58 supported by links 59 jointed to the inner ends of levers 60 (there being five of these levers 60 in the present loom) and the outer ends of said levers 60 are connected to links 61 jointed at their lower ends to the free ends of levers 62 pivoted at their opposite ends to the frame 12 and provided with pins 63 entering cam grooves 64 in cam wheels 65 attached to the main shaft 19. When the loom is in operation vertical reciprocating movements will be imparted to the reeds, for the purpose of beating up the wefts, through the operating mechanism just described. To render the operation of the reed frame easy and to economize power the parts are so proportioned that the weight of the reed frame, the reeds carried thereby and the links 59 will be counterbalanced by the levers 60 and the links 61. The advantage of this counterbalanced construction will be obvious.

The warp beams 66 are mounted in racks 67 which may be supported in any convenient manner. To the racks 67 are attached levers 68 provided with friction let-off pads 69 of well-known construction engaging flanges on the warp beams, and pivoted to the levers 68 are tension levers 70 provided with rollers 71. The warps 73 extend from the warp beams above the rollers 72 on the levers 68 and beneath the rollers 71 on the tension levers, the said levers being preferably furnished with weights 72′ as is usual. The warps 73, which are spread over the lengths of the warp beams, extend from the tension rollers 71 upward and are given a quarter turn so as to run between rods 74 through the stationary or back spreading reeds 75, and said warps run thence to the harness heddles where they are alternated in the usual manner in forming the sheds.

The woven webs 76 pass upward around take-up rolls 77 and thence around press rolls 78 and guide rolls 79 passing from the said guide rolls upward over rolls 80 to the sleeve bobbins 81 on which the webs are wound. The take-up rolls 77 are provided with gears 82 meshing with worms 83 carried by shafts 84 provided with ratchet wheels 85 engaged by pawls 86 pivoted to the upper ends of arms 86ª fixed to a rod 87 running the length of the loom, said rod being mounted in suitable supports on the frame 12 and having attached thereto an arm 88 to the outer end of which is jointed the upper end of a rod 89, the lower end of said rod being connected by a pin 90 to a lever 90ª. The lever 90ª is provided with a pin 90ᵇ entering a cam groove 65ª in a cam wheel 65 on the side thereof opposite the cam groove 64, said cam groove 65ª having but one throw part, while the cam grooves 64 have two throw parts to each rotation of the main shaft 19 on which said cam wheel is mounted. Thus the said lever 90ª will, through the connections just described, operate the said ratchet wheels to intermittingly turn the worm-carrying shafts 84 to take up the web.

The press rolls 78 are provided with pinions 91 meshing with gears 91ª fixed to the take-up rolls 77. The press rolls 78 are mounted on shafts 92 the ends of which are journalled in the lower parts of bars 93, the upper parts of said bars being slotted for the reception of the inner ends of levers 94 pivoted to brackets on the frame 12 and furnished at their outer ends with weights 95 which serve to pull the press rolls 78 yieldingly towards the take-up rolls 77.

Mounted at the top of the frame 12 are supports 96 to which are clamped pins 97 on which the sleeve bobbins 81 are adapted to rotate. The take-up rolls 77 are provided with annular grooves, and the bobbins 81 are also provided with similar annular grooves for the reception of elastic driving bands 98 for turning the said bobbins and winding up the webs. The bobbins 81 are retained in place on the pins 97 by the elastic driving bands 98 which may be ordinary rubber bands, and the said bobbins, when filled, may be readily released for removal simply by lifting or stretching the elastic bands 98 slightly. It will therefore be understood that this construction affords convenient means for removing and replacing the bobbins 81 quickly and easily, as well as simple means for rotating the said bobbins in winding up the webs.

Clamped to the rods 20 forming part of the harness frame, by set screws 99, are blocks 100 provided with notches for the reception of cross heddle bars 101 which are embraced by eyed portions at the ends of the heddles 102, it being understood that the number of heddles will correspond in practice to the number of warps which are to pass through holes 103 in the heddles. The blocks 100 are adjustably attached to the rods 20 so that they may be properly spaced apart according to the lengths of the heddles. Also attached to the rods 20, by set screws 104, are blocks 105 having round holes for the reception of a harness frame cross rod 23 to which an operating rod 24 is connected through a block 106 attached to said cross rod by a set screw 107.

The construction just described provides a convenient adjustable harness frame formed wholly of metal so that it is not subject to injurious wear or warping, as are harness frames which are formed partly of wood, the weight of the metal of this harness frame just described, and which has a swinging pendulous motion, not being objectionable in the present improved vertical loom construction.

The main frame 12 is shown in Figs. 2, 3 and 4 as being of a suitable size to accommodate two complete weaving mechanisms such as those shown and described, and it will therefore be understood that these mechanisms will, in practice, be duplicated, each of such mechanisms comprising its own electric motor, as 16, geared to a main shaft, as 19, extending the entire length of the main frame 12, together with the mechanisms operated from said main shaft, as hereinbefore described. In other words, each frame will support two complete independent looms which may both be in operation at the same time, or one may be running when the other is stopped for any reason. This will be convenient for the weaver attending the looms, as will be understood.

It will thus be apparent from the foregoing that this invention provides a very easily operated pendulous harness motion, as also an efficient shuttle motion in which the shuttles are operated positively and are so positioned, working on their backs, so to say, that they are adapted to carry very large cops of yarn without much friction, the shuttles working easily in their curved races. Thus the leverage and attendant friction incidental to previous narrow ware looms of the horizontal type, such, for example, as that of my patent No. 407,411, dated July 23, 1889, and in which the shuttles were extended horizontally and were held in the shuttle races at their backs and the weight of the cops of yarn and much of the weight of the shuttles was forward of the points of support of the shuttles, is entirely avoided in the present improved construction.

By reference more particularly to Figs. 7 and 15 of the drawings it will be seen that the shuttles 50 are evenly balanced, in that the weight thereof and the weight of the large cops of yarn which they are adapted to carry, is evenly supported by the rollers on which they run; and the said shuttles are evenly guided by the side ribs on said shuttles fitting between rollers or between rollers and guiding parts of the shuttle frames. In other words, the shuttles of this improved loom are constructed with central yarn or cop holding chambers to hold the yarns within the vertical planes of their supporting means or members, instead of forward of their supporting means as in prior art narrow ware looms, of which the loom of my Patent No. 407,411, above referred to is an example, and in which the weight of the cops of yarn, carried forward of the vertical planes of the shuttle supporting and driving means, occasioned considerable downward leverage with considerable resulting friction.

From the broken-out illustration of the invention in Fig. 1 it will be understood that the improved loom may be of any desired length to provide for weaving any desired number of webs simultaneously. In practice the improved loom will be of a size to weave say 40 webs of 5 inch width, and a proportionately larger number of webs of lesser width; and as the movements of the different mechanisms are positive and easy the improved loom may be run much faster with less power and fewer number of stops, owing to the large cops carried by the shuttles and the large warp beams, than the best types of narrow ware looms now in use. Also floor space, over that required for the looms now in use will be economized by the improved construction, as will also power and attendant service, as hereinbefore indicated.

I do not claim in this application the harness and heddle operating mechanisms hereinbefore described, as the same is covered by my application No. 666,353 filed October 3, 1923. Also I do not herein claim the reed operating and the web take-up mechanisms hereinbefore described, and the description and illustration of which it is desired to retain in this application for the reason that these mechanisms are necessary parts of a complete loom.

It will be understood that this invention is not limited to the details of construction herein shown and described, and that such details may be varied widely, within the province of mechanical skill, without departing from the essence and scope of the invention.

Having thus described my invention, I claim and desire to secure by Letters Patent:

1. In a loom, the combination with a shuttle race-way which is curved relative to a horizontal plane, of a curved, evenly balanced shuttle supported from said raceway and constructed with a central, longitudinally extending yarn-holding chamber adapted to hold a long cop of yarn, said shuttle being provided with a rack at its lower part, pinions underneath said shuttle and meshing with said rack, and means for operating said pinions to impart positive reciprocating movements to said shuttle in said race.

2. In a vertical loom, the combination with a plurality of shuttle raceways which are curved relative to a horizontal plane and which have guiding grooves, of curved, evenly balanced shuttles supported from said raceways, and having side ribs fitting said grooves, said shuttles being constructed with central, longitudinally extending yarn-holding chambers adapted to hold long cops of yarn, said shuttles being provided at their lower parts with curved racks, pinions underneath said shuttles and meshing with said racks, and means for reversely rotating said pinions to operate said shuttles positively.

3. In a vertical loom, the combination with a plurality of shuttle raceways which are curved relative to a horizontal plane and which have guiding grooves and rollers, of curved, evenly balanced shuttles supported from said raceways and having side ribs fitting in said grooves and also between pairs of said rollers, said shuttles being constructed with central, longitudinally extending yarn-holding chambers, and being provided at their lower parts with curved racks, pinions underneath said shuttles and meshing with said racks, and means for actuating said pinions to operate said shuttles positively.

4. In a vertical loom, the combination with a plurality of shuttle races which are curved relative to a horizontal plane, of a plurality of curved, evenly balanced shuttles fitting said races and constructed with central yarn holding chambers so as to carry yarns within the vertical planes of their supporting means and being each provided with a rack at its lower part, pinions underneath said shuttles and meshing with said racks, shafts extending throughout the width of the loom and to which said pinions are attached, and means for imparting reverse rotary movements to said shafts.

5. In a vertical narrow ware loom, the combination with a plurality of shuttle races which are curved relative to a horizontal plane and which have guiding grooves, of a plurality of curved, evenly balanced shuttles fitting said races and having side ribs fitting said grooves, said shuttles being constructed with central yarn-holding chambers so as to carry yarns within the vertical planes of their supporting means and being each provided at its lower part with a curved rack, pinions underneath said shuttles and meshing with said racks, shafts extending throughout the width of the loom and to which said pinions are attached, and means for imparting reverse rotary movements to said shafts.

6. In a vertical narrow ware loom, the combination with a plurality of shuttle races which are curved relative to a horizontal plane, and which have guiding grooves and rollers, of a plurality of curved, evenly balanced shuttles having side ribs fitting in said grooves and also between pairs of said rollers, each of said shuttles being provided with a central yarn chamber and having at its lower part a curved rack, pinions underneath said shuttles and meshing with said racks, shafts extending throughout the width of the loom and to which the said pinions are attached, and means for imparting reverse rotary movements to said shafts.

In testimony whereof I affix my signature.

GEORGE C. MOORE.